United States Patent [19]
Thiessen

[11] 3,895,833
[45] July 22, 1975

[54] FLANGE CONNECTOR ASSEMBLY FOR GROOVED PIPE

[75] Inventor: Leo K. Thiessen, Shawnee Mission, Kans.

[73] Assignee: Certain-Teed Products Corporation, Valley Forge, Pa.

[22] Filed: Feb. 19, 1974

[21] Appl. No.: 443,663

[52] U.S. Cl. .............. 285/413; 285/111; 285/368
[51] Int. Cl.² ........................................ F16L 23/00
[58] Field of Search .......... 285/337, 415, 413, 368, 285/111, 412, 411

[56] References Cited
UNITED STATES PATENTS

| | | | |
|---|---|---|---|
| 696,603 | 4/1902 | Smith | 285/337 X |
| 1,951,034 | 3/1934 | Norton | 285/413 |
| 2,415,753 | 2/1947 | Newell | 285/413 X |
| 2,822,195 | 2/1958 | Hoke | 285/337 |
| 2,969,995 | 1/1961 | Boughton | 285/337 X |
| 3,352,579 | 11/1967 | Hoke | 285/337 |
| 3,469,852 | 9/1969 | Smith et al. | 285/337 X |
| 3,515,416 | 6/1970 | Pickert | 285/413 |
| 3,700,270 | 10/1972 | Howard | 285/337 |
| 3,761,114 | 9/1973 | Blakeley | 285/111 |

Primary Examiner—Thomas F. Callaghan
Attorney, Agent, or Firm—Thomas M. Scofield

[57] ABSTRACT

A flange connector assembly is provided which includes circular flange segments for positioning on a grooved pipe as a complete flange. The flange has a substantially planar front surface, an internal peripheral lip to engage the pipe groove, a peripheral recess in the inner surface thereof for receiving a gasket and bolt apertures therethrough. Each flange segment includes two end portions which overlap the connecting end portions of the adjacent flange segment. Oversized bolt apertures through the connecting end portions cooperate with wedge means between each of the connecting end portions to assist in assembly of the complete flange assembly on a grooved pipe.

5 Claims, 4 Drawing Figures

FLANGE CONNECTOR ASSEMBLY FOR GROOVED PIPE

BACKGROUND OF THE INVENTION

This invention relates to a flange connector for joining together lengths of unflanged grooved pipe and particularly, although not exclusively, to a flange connector for joining together a length of grooved pipe and a flanged pipe fitting.

Generally pipe fittings such as tees, elbows and valves are formed with flange connections. To connect these fittings with pipes, the pipe must also include a connecting flange. One prior art connecting flange described in U.S. Pat. No. 3,761,114 to J. Blakeley is formed of two mating sections preassembled with a bronze bushing at a hinge point. A special lock bolt is required for attaching the mating ends. This unit is costly to fabricate. In addition, it is difficult to close and connect the hinged segments with the special bolt on out-of-round pipe.

SUMMARY OF THE INVENTION

A novel flange connector assembly is provided for coupling an unflanged groove pipe which includes circular flange segments for positioning on a grooved pipe as a complete flange. The complete flange has a substantially planar front surface, an internal peripheral lip to engage the pipe groove, a peripheral recess in the inner surface thereof for receiving a gasket, and bolt apertures therethrough. Each flange segment includes two end portions which overlap the corresponding end portions of the adjacent flange segment. Oversized bolt apertures through the connecting end portions cooperate with wedge means between each of the connecting end portions to assist in the assembly of the complete flange assembly on a grooved pipe. This permits easy assembly on out-of-round pipe, especially where large tolerances are permitted.

BRIEF DESCRIPTION OF THE DRAWINGS

Figure 1:
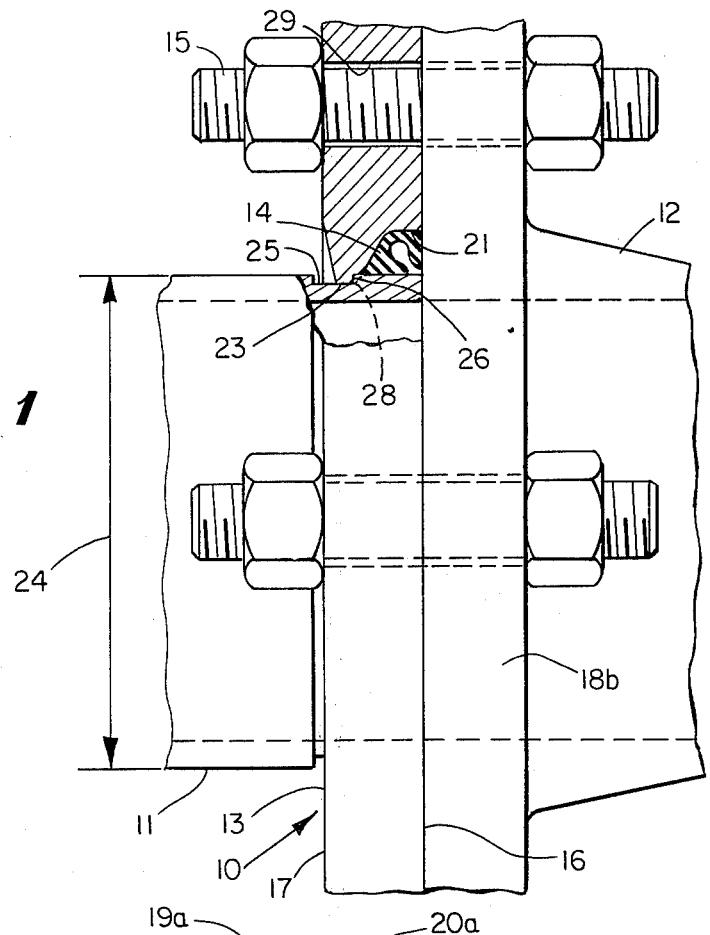
FIG. 1 is an illustration in partial cross section of the novel flange connector assembly of this invention connecting a grooved pipe and a standard flange.

FIG. 1 illustrates the novel flange connector assembly 10 connecting a pipe 11 and an article having a standard flange 12 thereon. Two of the novel flange connector assemblies 10 also may be used together to connect two pipe lengths.

The novel flange connector assembly 10 includes a segmented flange 13, a gasket 14, and connecting bolts 15. The flange 13 has a substantially planar front surface 16 and rear surface 17. It is preferred that the flange 13 is formed of two segments; that is, a first flange segment 18a and a second flange segment 18b. The segmented flange 13 may also be formed of three or more multiple flange segments. The first segment 18a includes a first end portion 19a and second end portion 19b. The second segment 18b includes a first end portion 20a and a second end portion 20b. The end portions 19a and 20a overlap and the end portions 19b and 20b similarly overlap when assembled to form the circular flange 13.

The segments 18a and 18b also include a first interior peripheral recess 21 to receive the gasket 14. The assembled flange includes a lip 23 having an inside diameter 22 which is smaller than the outside diameter 24 of the pipe 11. The lip 23 engages a groove 25 in the pipe 11. The segments 18a and 18b may also include a second internal peripheral recess 26 having a diameter slightly larger than the outside diameter 24 of the pipe 11. The second recess 26 may also be interrupted by grip means 27. In the preferred embodiment, the grip means 27 include at least four V-shaped projections or teeth 28 extending from the second recess 26 in the direction of the front surface 16.

Figure 2:
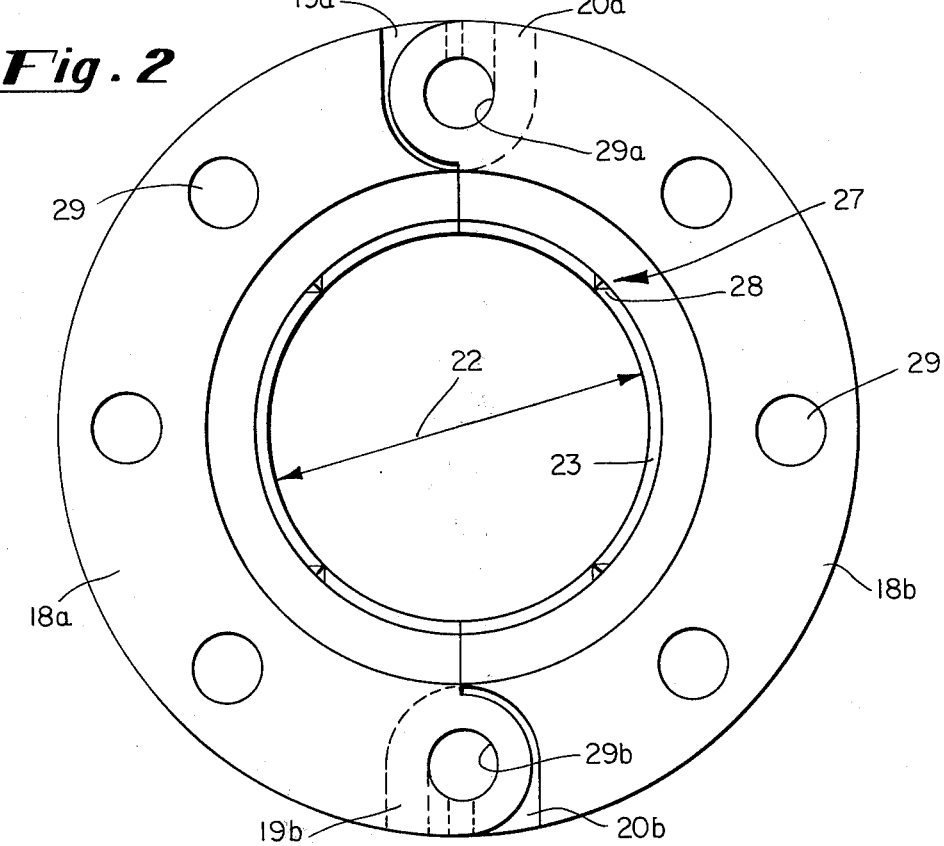
FIG. 2 is a front elevational view of the novel segmented flange of the flange connector assembly shown in FIG. 1.

The flange 13 also includes eight equally spaced bolt apertures 29 therein as shown in FIG. 2 for attachment to a corresponding flanged member by bolts 15. One bolt aperture 29a is positioned substantially centered on the connecting overlapping end portions 19a and 20a and one bolt aperture 29b is positioned substantially centered on the connecting overlapping end portions 19a and 20b. The apertures 29a and 29b are overwize, that is they are larger in diameter than the diameter of the bolts 15.

Figure 3:
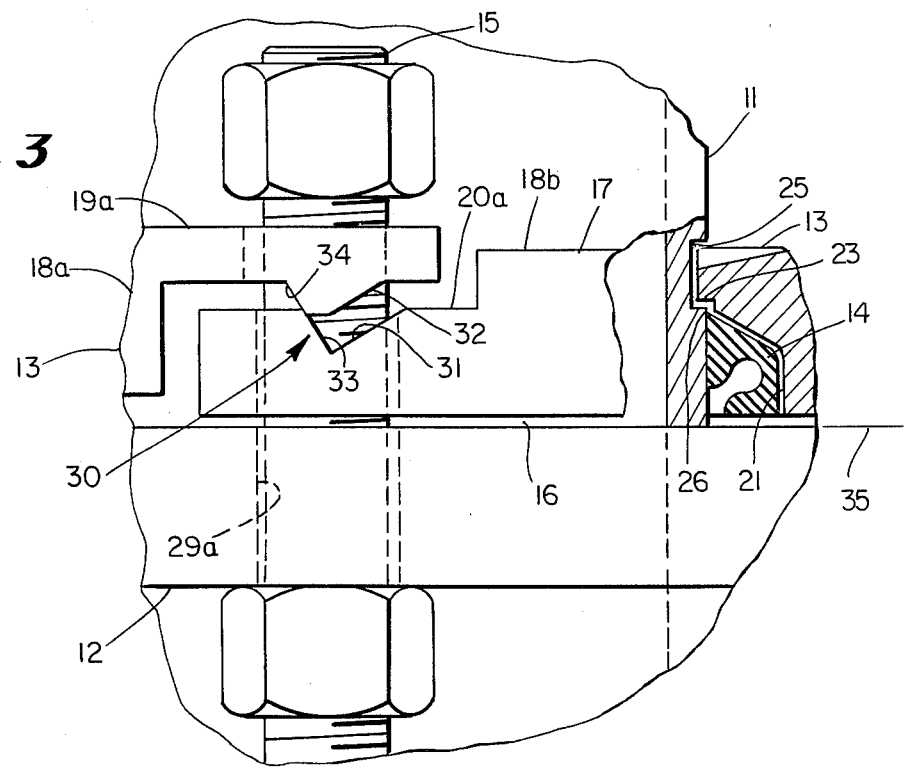
FIG. 3 is an enlarged fragmentary top elevational view of the novel flange connector of FIG. 1 illustrating the initial position of the segmented flanges.
Figure 4:
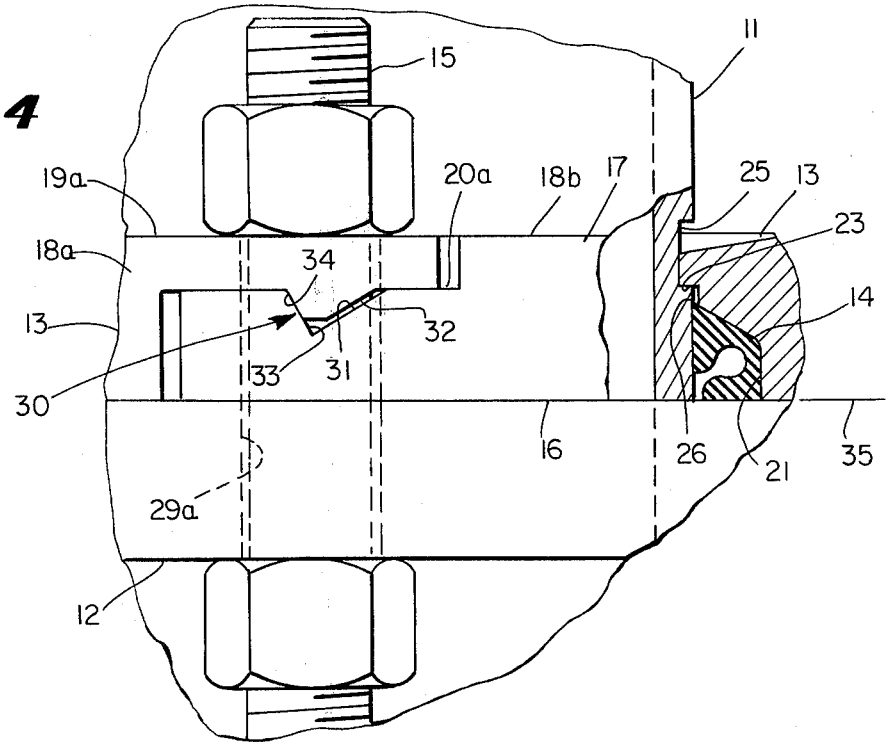
FIG. 4 is a view similar to FIG. 3 illustrating the final position of the segmented flanges.

The corresponding overlapping end portions of each of the flange segments 18a and 18b also include wedge means 30 therebetween. In the preferred embodiment, shown in FIGS. 3 and 4 the wedge means 30 comprises a V-shaped groove 31 formed on the inside surface of each of the connecting ends 19a and 20b and a V-shaped projection 32 formed on the inside face of each of the connecting ends 19b and 20a. The grooves 31 and projections 32 are formed to initially engage as shown in FIG. 3 and to finally engage as shown in FIG. 4. It can readily be observed from FIG. 3, that the wedging force is obtained from the matched angled contacting surfaces 33 and 34. The other portions of the groove 31 and projection 32 have no wedging functions and are formed for clearance only. It is preferred that the angled surfaces 33 and 34 are formed at an acute angle in the range of 60° to 80° from the plane 35 of the flange 13. The preferred angle is 60°.

In assembling the novel flange assembly 10, the gasket 14 is positioned on the pipe 11 and the end of the pipe 11 is positioned adjacent the standard flange 12. The segments 18a and 18b of the flange 13 are fitted over the gasket 15 and around the pipe 11 until the wedge means 30 on the overlapping ends are engaged substantially as shown in FIG. 3. The apertures 29 therein are also aligned with the standard flange 12. At this position the two segments 18a and 18b form a slightly elongated circular flange. Since the apertures 29a and 29b in the overlapping end portions 19a and 20a and 19b and 20b are oversize, two bolts 15 can be inserted through these apertures and the corresponding apertures in the connecting standard flange 12. Then these two bolts are tightened. The bolts cooperate with the wedge means 30 to pull the connecting ends of the flange 13 together and against the standard flange 12 as shown in FIG. 4. When the bolts are tightened, the angled surface 33 slides on the angled surface 34 to force the two segments 18a and 18b into a substantially circular flange shape.

The remaining bolts 15 are inserted and tightened after the flange 13 is of substantially circular shape. When all the bolts 15 are tightened, the grip means 27 engages an edge of the groove 25 thereby preventing rotation of the pipe 11 in the novel flange connector assembly 10.

I claim:

1. A flange connector assembly for coupling a grooved pipe to a matching flanged member comprising:

a plurality of arcuate flange segments for positioning on the pipe and assembling to make a complete, rigid, circular connector;

said complete connector having a front face adapted to abut flush against the matching flanged member, a rear face, a radially inboard lip to engage the pipe groove, a central, circumferential recess therein opening out of the front face and adjacent the pipe to receive a gasket, and bolt apertures through the body thereof;

each of said segments having opposite and unlike end ear portions of lesser thickness than the rest of the segment extending from the ends thereof, the opposite ear portions of a given segment oriented in line with the front and rear faces of the segment, respectively, whereby to be displaced from one another;

each said segment ear portion operative to overlap an unlike ear portion of another segment in assembly of the connector;

each segement ear portion having an oversized bolt hole therethrough; and unlike wedge means mounted on each of said segment ear portions and facing in opposite directions on said segment adapted to cooperate with the unlike wedge means and oversized bolt apertures of adjacent segments in assembly of the circular connector, whereby tightening of bolts engaging overlapping ear portions of adjacent segments causes the wedge means thereof to force the segments into rigid engagement, one with the other, against the matching flange member.

2. A connector assembly as in claim 1 wherein the ear portions of each said segment are of unequal thickness, the ear portion of greater thickness having a substantially radially extending groove with a first angled surface formed in the face thereof spaced inwardly from the segment face, the ear portion of lesser thickness having a substantially radially extending projection extending from the face thereof spaced inwardly from the segment face having a second angled surface matching and adapted to bear against the first surface in wedging action.

3. The connector of claim 2 wherein the angle of said first and second surfaces is in the range of 60° to 80° with respect to the plane of said assembled connector.

4. A connector assembly as in claim 2 wherein the radially extending groove extends into the enlarged bolt hole of the ear portion carrying same, while the radial projection is provided only outboard of the ear portion with respect to the oversized bolt hole therethrough.

5. The connector assembly of claim 1 including a second recess formed in the inboard wall of said gasket recess having an outer diameter substantially equal to the outside diameter of the pipe, said grip means interrupting said second recess, whereby, upon tightening said connector against said matching flange member, said grip means penetrate into and engage the wall of the grooves in said pipe.

* * * * *